United States Patent
Kelsh et al.

(10) Patent No.: US 10,032,360 B1
(45) Date of Patent: Jul. 24, 2018

(54) IN-VEHICLE APPARATUS FOR EARLY DETERMINATION OF OCCUPANT INJURY

(71) Applicant: Allstate Insurance Company, Northbrook, IL (US)

(72) Inventors: John P. Kelsh, Antioch, IL (US); Clint J. Marlow, Barrington Hills, IL (US); Nicole M. Hildebrandt, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 70 days.

(21) Appl. No.: 15/351,945

(22) Filed: Nov. 15, 2016

(51) Int. Cl.
| | |
|---|---|
| *G08B 25/01* | (2006.01) |
| *G01S 19/17* | (2010.01) |
| *G01C 21/36* | (2006.01) |
| *B60R 21/00* | (2006.01) |
| *G07C 5/00* | (2006.01) |

(52) U.S. Cl.
CPC ............ *G08B 25/016* (2013.01); *B60R 21/00* (2013.01); *G01C 21/3691* (2013.01); *G01S 19/17* (2013.01); *B60R 2021/0027* (2013.01); *G07C 5/008* (2013.01)

(58) Field of Classification Search
CPC .................. G08B 25/016; B60R 21/00; B60R 2021/0027; G01C 21/3691; G01S 19/17; G07C 5/008
See application file for complete search history.

(56) References Cited

U.S. PATENT DOCUMENTS

| | | | |
|---|---|---|---|
| 7,044,742 B2 | 5/2006 | Sumiya et al. | |
| 7,693,720 B2 | 4/2010 | Kennewick et al. | |
| 8,447,607 B2 | 5/2013 | Weider et al. | |
| 8,742,910 B2 | 6/2014 | Westerblad et al. | |
| 8,825,277 B2 | 9/2014 | McClellan et al. | |
| 9,053,637 B2 | 6/2015 | Mawbey et al. | |
| 9,211,811 B2 | 12/2015 | Breed | |
| 9,717,101 B1 * | 7/2017 | Burnham | H04W 4/021 |
| 9,773,281 B1 * | 9/2017 | Hanson | G06Q 40/08 |
| 2002/0059084 A1 | 5/2002 | Wahlbin et al. | |
| 2002/0103622 A1 | 8/2002 | Burge | |
| 2009/0198733 A1 | 8/2009 | Gounares et al. | |
| 2012/0029763 A1 | 2/2012 | Hering | |
| 2013/0069802 A1 | 3/2013 | Foghel et al. | |

(Continued)

OTHER PUBLICATIONS

White, et al., "WreckWatch: Automatic Traffic Accident Detection and Notification with Smartphones," Virginia Tech, Dept. of Elecrical and Computer Engineering, Journal of Mobile Networks and Applications Manuscript, 2011, 28 pages.

(Continued)

*Primary Examiner* — Mohamed Barakat
(74) *Attorney, Agent, or Firm* — Banner & Witcoff, Ltd.

(57) ABSTRACT

Apparatuses, systems, and methods are provided for determining injuries to occupants (e.g., drivers, passengers, etc.) of a vehicle after an accident. A telematics system may be configured to receive telematics data from one or more vehicles involved in an accident. Using the received telematics data, a computing device of the telematics system may determine injuries sustained by passengers of the one or more vehicles. In response to determining the injuries sustained, the computing device may provide such information to one or more of the occupants via a mobile device and an urgent care facility.

20 Claims, 3 Drawing Sheets

(56) References Cited

U.S. PATENT DOCUMENTS

2014/0306826 A1 10/2014 Ricci
2015/0087279 A1* 3/2015 Dawson ................. G06Q 50/18
   455/414.1
2015/0127570 A1* 5/2015 Doughty .............. G06Q 50/265
   705/325
2016/0094964 A1 3/2016 Barfield, Jr. et al.
2016/0303969 A1* 10/2016 Akula .................... B60K 35/00
2017/0101054 A1* 4/2017 Dusane ................. G08G 1/127

OTHER PUBLICATIONS

Javale, et al., "Accident Detection and Surveillance System using Wireless Technologies," IOSR Journal of Computer Engineering, vol. 16, Issue 2, Mar.-Apr. 2014, pp. 38-43.
Apr. 13, 2016 (US) Specification and Drawings as filed—U.S. Appl. No. 14/685,067, 35 pages.
Sep. 21, 2016 (US) Specification and Drawings as filed—U.S. Appl. No. 15/271,813, 87 pages.

* cited by examiner

IN-VEHICLE APPARATUS FOR EARLY DETERMINATION OF OCCUPANT INJURY

TECHNICAL FIELD

Aspects described herein generally relate to systems and methods for determining injuries to passengers of a vehicle after an accident (e.g., a vehicular incident whether accidental or intentional). In particular, various aspects of the disclosure relate to the usage of vehicle telematics data in determining injuries to passengers of a vehicle after an accident.

BACKGROUND

Vehicle accidents can result in injuries to drivers and passengers. However, knowledge of systems, methods, and computing devices configured to analyze accident data to determine the specificities of the injuries to the driver and passengers are insufficient.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to systems, methods, and computing devices configured to receive telematics data from one or more vehicles involved in an accident. Using the received telematics data, a computing device may determine injuries likely to have been sustained by passengers of the one or more vehicles. In response to determining the injuries likely to have been sustained, the computing device may provide such information to one or more of the passengers via a mobile device associated with each of the one or more passengers. Additionally, the computing device may provide information corresponding to a medical professional specializing in treatment of the injuries sustained by the one or more passengers in the geographical proximity of the location of the accident.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
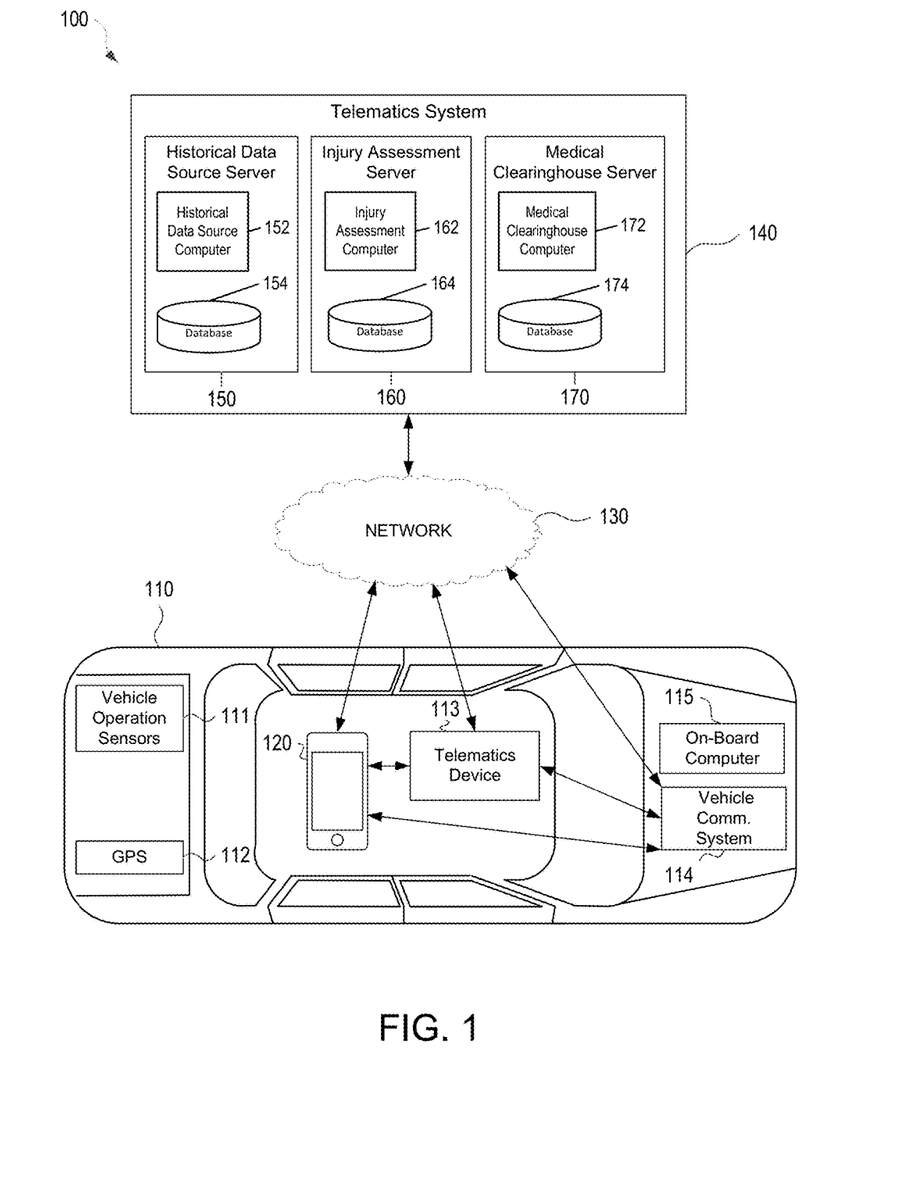
FIG. 1 illustrates an injury determination system according to one or more aspects of the present disclosure.
Figure 3:
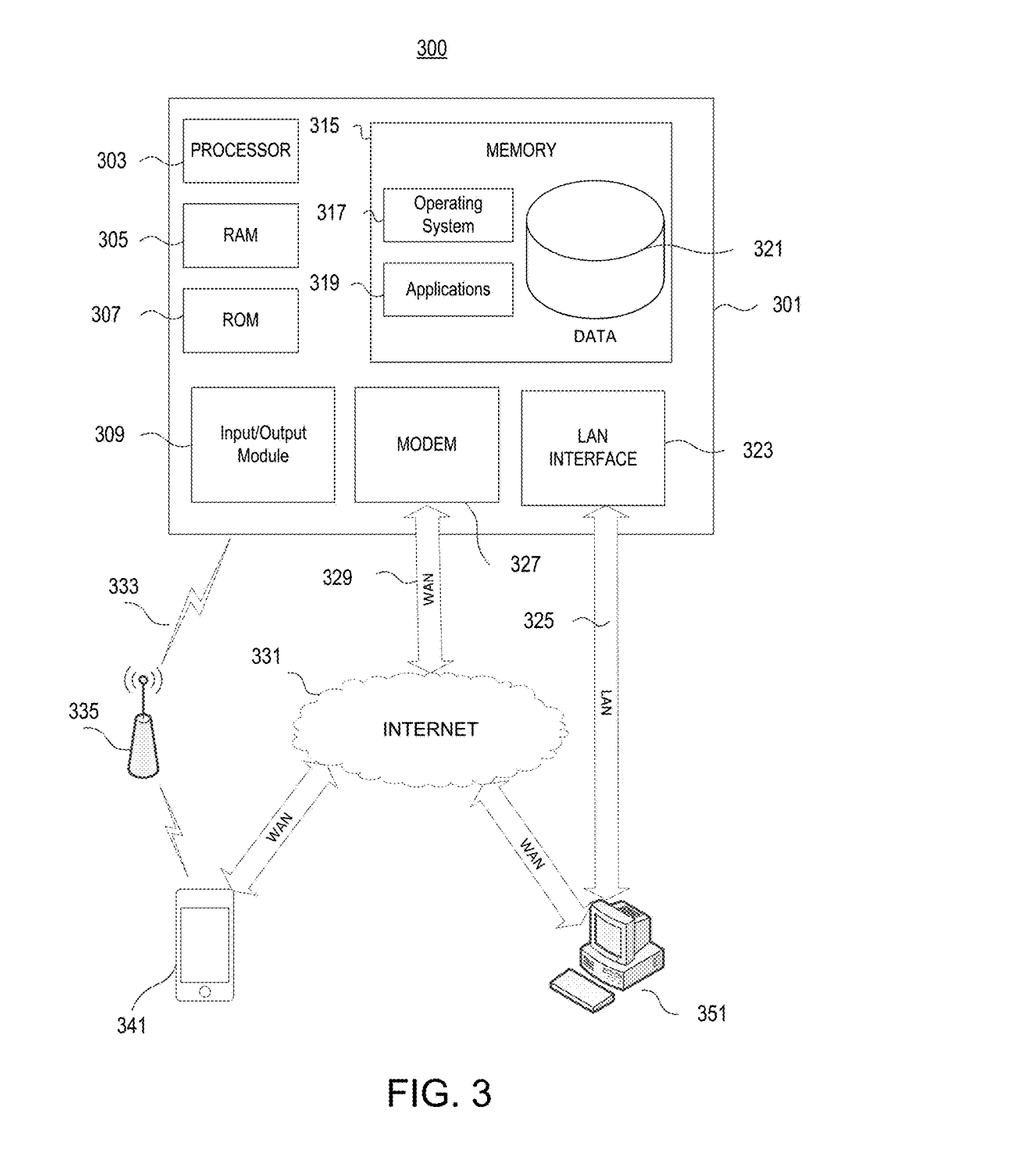
FIG. 3 depicts an illustrative operating environment in which various aspects of the present disclosure may be implemented.

FIG. 1 is a diagram illustrating various example components of an injury determination system 100 according to one or more aspects of the disclosure. Injury determination system 100 may include a vehicle 110, a mobile computing device 120, a network 130, and a telematics system 140. Each component shown in FIG. 1 may be implemented in hardware, software, or a combination of the two. Additionally, each component of the injury determination system 100 may include a computing device (or system) having some or all of the structural components described below with respect to computing device 301 as shown in FIG. 3.

Vehicle 110 of the injury determination system 100 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. In some instances, the injury determination system 100 may include a plurality of vehicles each of which functioning similar to vehicle 110. The vehicle 110 may include vehicle operation sensors 111 capable of detecting, recording, and/or transmitting various vehicle performance and/or operational data and environmental conditions data. For example, sensors 111 may detect, store, and/or transmit data corresponding to the vehicle's speed, rates of acceleration and/or deceleration, braking, swerving, and the like. Sensors 111 also may detect, store and/or transmit data received from the vehicle's internal systems, such as an impact to the body of the vehicle, air bag deployment, seatbelt usage, and the like.

Sensors 111 also may detect, store, and/or transmit data relating to moving violations and the observance of traffic signals and signs by the vehicle 110. Additional sensors 111 may detect, store, and/or transmit data relating to the maintenance of the vehicle 110, such as the engine status, oil level, engine coolant temperature, odometer reading, the level of fuel in the fuel tank, engine revolutions per minute (RPMs), and/or tire pressure. In some instances, vehicle 110 may include a Global Positioning System (GPS) 112 which may be used to detect the vehicle's position and/or location data associated with the vehicle.

Vehicle sensors 111 and GPS 112 may be configured to transmit data to one or more internal computing systems including telematics device 113 and/or vehicle on-board computer 115. Additionally, vehicle sensors 111 and GPS 112 may be configured to independently transmit the above-mentioned data to one or more external computing systems including mobile device 120 and/or telematics system 140. In some instances, the data transmission to the one or more external computing systems may be performed via telematics device 113 and/or vehicle communication system 114. In such cases, the vehicle sensors 111 and GPS 112 may be configured to transmit data to telematics device 113 and/or vehicle communication system 114 which, in turn, may be configured to transmit the data to the one or more external systems.

Telematics device 113 may be configured to receive vehicle performance and/or operational data (e.g., telematics data) in the form of a data stream from on-board computer 115 via a data port, Bluetooth interface, or any comparable communication interface of the vehicle 110. For example, telematics device 113 may include an on-board diagnostic (OBD) device adapter and may be connected to an OBD port of the vehicle 110. In certain embodiments, telematics device 113 may be configured to receive vehicle performance and/or operational data directly from vehicle sensors 111, GPS 112, on-board computer 115, and/or mobile device 120 via a wired or wireless connection. Telematics device 113 may include a memory to store data received from vehicle sensors 111, GPS 112, on-board computer 115, and/or mobile device 120.

In some embodiments, telematics device 113 may store in memory a vehicle identification number (VIN) of a vehicle 110 associated with an insurance policy of an insured driver to corroborate vehicle performance and/or operational data. The VIN associated with vehicle 110 may also be stored in memory associated with on-board computer 115. During operation of vehicle 110, the on-board computer 115 may attach the VIN of vehicle 110 to the data stream comprising the vehicle performance and/or operational data. On-board computer 115 may output the data stream comprising the VIN and vehicle performance and/or operational data to telematics device 113. Telematics device 113 may corroborate the VIN received in the data stream from on-board computer 115 to the VIN stored in memory. In doing so, telematics device 113 may determine whether or not it is operating in the vehicle associated with the insurance policy of the insured driver.

The vehicle performance and/or operational data (e.g., telematics data) may be collected with appropriate permissions (e.g., from the driver, vehicle owner, etc.) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. The system may recognize or be configured to recognize a particular language emitted by the vehicle system and may configure the recording component to receive or convert data in SAE J1850, ISO IS09141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 113 may also include sensors such as, but not limited, an accelerometer, compass, gyroscope, and GPS system. Telematics device 113 may include antennas to communicate with other devices wirelessly. For example, telematics device 113 may communicate with mobile device 120 and/or telematics system 140 over a wide area network (WAN), cellular network, Wi-Fi network, and the like. Telematics device 113 may also communicate with mobile device 120 via a Bluetooth connection. In certain embodiments, telematics device 113 may be configured to establish a secure communication link and/or channel with mobile device 120 and/or telematics system 140.

In some arrangements, telematics device 113 may be a telematics application operating on mobile computing device 120 and may utilize hardware components comprised therein (e.g., memory, processors, communication hardware, etc.) to receive, store, and/or transmit vehicle performance and/or operational data outputted by the on-board computer 115. In such an arrangement, telematics device 113 may also utilize sensors included within mobile device 120.

Vehicle communication systems 114 may be implemented using wireless protocols such as WLAN communication protocols (e.g., IEEE 802.11), Bluetooth (e.g., IEEE 802.15.1), one or more of the Communication Access for Land Mobiles (CALM) wireless communication protocols and air interfaces, and the like. In certain systems, communication systems 114 may include specialized hardware installed in vehicle 110 (e.g., transceivers, antennas, etc.), while in other examples the communication systems 114 may be implemented using existing vehicle hardware components (e.g., radio and satellite equipment, navigation computers). In some instances, the vehicle communication systems 114 may be configured to transmit data provided by vehicle sensors 111, GPS 112, and telematics device 113 to one or more external computing devices over a wide area network (WAN), cellular network, Wi-Fi network, and the like. Similarly, the communications systems 114 may be configured to receive data from one or more external computing systems. In some instances, vehicle communication systems 114 may be configured to transmit data to one or more external computing systems.

Vehicle control computer 115 may contain some or all of the hardware/software components as the computing device 301 depicted in FIG. 3, and may be configured to operate aspects of the driving, or other operation of vehicle 110, including but not limited to, acceleration, braking, steering, and/or route navigation. Furthermore, vehicle control computer 115 may be configured to operate one or more internal vehicle systems and/or components including at least a vehicle sound system, dashboard display and/or heads-up display system, interior lighting system, climate control system, door locking systems, and the like. Similarly, vehicle control computer 115 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 115 may be configured to receive and analyze vehicle performance and operational data provided by vehicle sensors 111, GPS 112, telematics device 113, and mobile device 120 in order to determine that an accident has occurred and to participate in the injury determination procedures described in further detail below.

In certain embodiments, mobile computing device 120 may be included within the vehicle 110 and may be used to independently collect vehicle driving data and/or to receive vehicle driving data from one or more vehicle systems. Mobile computing device 120 may be, for example, a mobile phone, personal digital assistant (PDA), or tablet computer of the driver or passenger(s) of vehicle 110. Software applications executing on mobile computing device 120 may be configured to independently detect certain driving data. For example, mobile device 120 may be equipped with one or more accelerometers and/or GPS systems which may be accessed by software applications executing on mobile computing device 120 to determine vehicle location, speed, direction, and other basic driving data. As stated above, mobile computing device 120 may be configured to transmit the independently collected vehicle driving data and/or the received vehicle driving data and environmental conditions data to one or more external computing devices (e.g., telematics system 140). In other examples, software on mobile computing device 120 may be configured to receive some or all of the driving data collected by vehicle sensors 111 and GPS 112. Mobile computing device 120 may also determine that an accident has occurred and participate in the injury determination procedures described herein.

The injury determination system 100 may include a telematics system 140 including a historical data source server 150, an injury assessment server 160, and a medical clearinghouse server 170. The telematics system 140 and each of the historical data source server 150, injury assessment server 160, and medical clearinghouse server 170 may contain some or all of the hardware/software components as the computing device 301 depicted in FIG. 3.

Historical data source server 150 may comprise a historical data source computer 152 for receiving and/or processing historical data including insurance claims, casualty claims, accident reports, injury assessment profiles, vehicle operations data (e.g., telematics data) associated with insurance claims, casualty claims, accident reports, and the like. The historical data source server 150 may also comprise a database 154 used to store the historical data collected by any of the computing devices in injury determination system 100. In specific regards to the injury assessment profiles, historical data source database 154 may store an injury assessment matrix and for each injury assessment profile. In some instances, the injury assessment matrices for each of the injury assessment profiles may include telematics data associated with an accident and corresponding injuries sustained in the accident. The historical data source server 150 may be configured to transmit the historical data stored in historical data source database 154 to injury assessment server 160, medical clearinghouse server 170, mobile device 120, telematics device 113, and/or on-board computer 115 for aiding in the injury determination procedures described herein.

Injury assessment server 160 may comprise an injury assessment computer 162 for receiving, processing, and/or transmitting telematics data, responses to questions regarding an accident, and the like. The injury assessment server 160 may also comprise an injury assessment database 164 used to store the telematics data, responses to questions regarding an accident, and the like received by injury assessment computer 162. In some instances, the injury assessment database 164 may be configured to store data received from historical data source server 150 and medical clearinghouse server 170. The injury assessment server 160 may be configured to transmit data stored in injury assessment database 164 to historical data source server 150, medical clearinghouse server 170, mobile device 120, telematics device 113 and/or on-board computer 115 for aiding in the injury determination methods described herein.

Injury assessment computer 162 of injury assessment server 160 may be able to determine, based on the vehicle operational data (e.g., telematics data) received from telematics device 113, on-board computer 115 via vehicle communication systems 114, and/or mobile device 120, that vehicle 110 has been involved in an accident. For example, upon receiving data indicating that vehicle 110 has rapidly decelerated from 60 mph to 0 mph without also receiving breaking data, injury assessment computer 162 of injury assessment server 160 may determine that vehicle 110 has been in an accident. In some instances, injury assessment server 160 may be configured to receive data from each of a plurality of vehicles involved in the accident. For example, if a first vehicle and a second vehicle are involved in an accident with each other, injury assessment server 160 may be able to receive the telematics data at the time of the accident from each of the first and second vehicles. In some instances, the telematics data corresponding to the first and second vehicles may be interconnected by injury assessment server 160 in order to provide more comprehensive injury assessment analysis.

After receiving data indicating that vehicle 110 was involved in an accident, injury assessment computer 162 of injury assessment server 160 may be configured to conduct post-accident assistance measures for the driver of vehicle 110 involved in the accident. As will be discussed in further detail below, such post-accident assistance measures may include notifying emergency response personnel that an accident has occurred.

Responsive to completing the post-accident assistance measures, injury assessment computer 162 of injury assessment server 160 may be configured to perform injury determination methods in conjunction with historical data source server 150 and medical clearinghouse server 170 in order to determine injuries likely to have been sustained by the driver of vehicle 110 and additional passengers included therein. Aspects of the injury determination method performed by loss assessment computer 162 of injury assessment server 160 may include receiving responses to questions regarding an accident and determining injuries likely to have been sustained by the driver and/or passengers of vehicle 110 based on the telematics data and the responses to the questions regarding the accident. The injuries sustained by the driver and/or passengers of the vehicle may be further determined by an assessment of the symptoms identified/provided by the respondent to the questions regarding the accident. In some examples, the questions may be tailored to identify particular symptoms that evidence the occurrence (or eventual occurrence) of particular injuries.

Medical clearinghouse server 170 may comprise a medical clearinghouse computer 172 and medical clearinghouse database 174 to facilitate the arrangement of medical assistance for a driver and/or passengers of vehicle 110 injured after being involved in an accident. In some instances, medical clearinghouse database 174 may store data associated with urgent care facilities, clinics, and hospitals such as profiles, ratings, accepted insurance providers, availability schedules, and the like. Medical clearinghouse computer 172 may be configured to provide a sortable list and/or map comprising data corresponding to urgent care facilities, clinics, and hospitals to a driver of vehicle 110. In some instances, medical clearinghouse computer 172 may be able to consolidate the urgent care facility, clinic, and hospital data presented to the driver of vehicle 110 based on vehicle location data provided by GPS 112, telematics device 113, and/or mobile computing device 120. Additionally and/or alternatively, medical clearinghouse computer 172 may be configured to consolidate the urgent care facility, clinic, and hospital data presented to the user based on location information (e.g., a zip code) provided by a user and/or associated with an insurance policy of the user.

The medical clearinghouse computer 172 of medical clearinghouse server 170 may be configured to arrange an appointment between the driver and/or passengers of vehicle 110 injured in an accident and a medical professional. In arranging the appointment, medical clearinghouse computer 172 of medical clearinghouse server 170 may be configured to provide the information corresponding to the accident (e.g., vehicle operational data and accident data provided by the driver of vehicle 110 during the injury determination measures) to one or more urgent care facilities, clinics, and/or hospitals in the vicinity of the user. After providing the accident information to the one or more repair shops, repair clearinghouse computer 172 of medical clearinghouse server 170 may be configured to coordinate interactions between the user and the one or more urgent care facilities, clinics, and/or hospitals to schedule an appointment. Upon arranging an appointment, medical clearinghouse computer 172 may be configured to provide medical updates to the driver and/or passengers of vehicle 110 injured in the accident.

The following steps that are described in regards to FIG. 2 may be implemented by one or more of the components of FIGS. 1 and 3 (described in detail below) and/or other components, including other computing devices.

Figure 2:
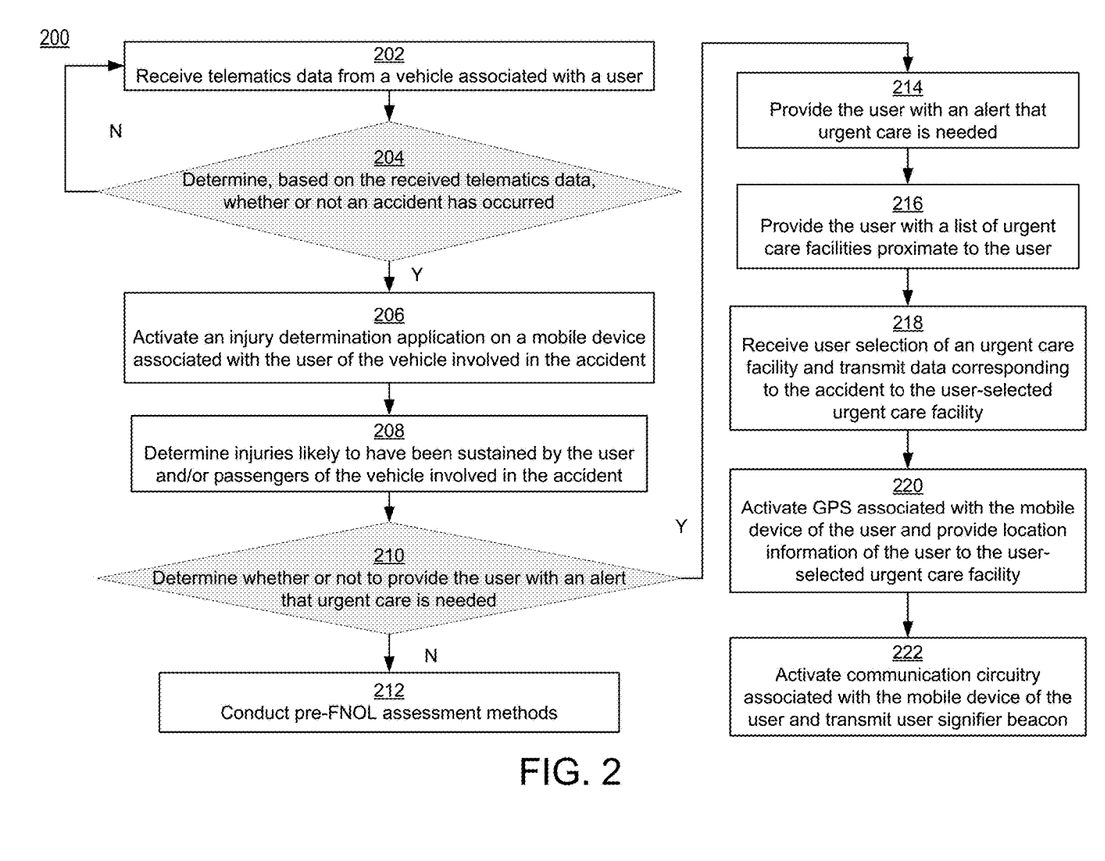
FIG. 2 depicts a flow chart for an injury determination method according to one or more aspects of the present disclosure.

FIG. 2 depicts a flow chart for an injury determination method according to one or more aspects of the present disclosure. In some examples, the injury determination method may be included in an injury determination application downloaded from telematics system 140 onto a mobile computing device associated with a user (e.g., driver and/or passengers of vehicle 110). The downloaded application may interface with telematics system 140 in order to perform the injury determination method described herein. Furthermore, such an application may be a multi-functional application and may also include a telematics method enabling mobile device 120 to receive vehicle operation data from telematics device 113 and/or detect vehicle operation data through one or more sensors (e.g., accelerometer, GPS, etc.) included in mobile device 120. Additionally and/or alternatively, the injury determination method may be a web-based injury determination application performed on telematics system 140. In such instances, mobile device 120 may access a webpage associated with telematics system 140 in order to participate in the injury determination method described herein.

The method of FIG. 2 may commence at step 202 wherein telematics system 140 may receive telematics data from a vehicle 110 associated with a user. The telematics data may be received from telematics device 113, vehicle control computer on-board computer 115 via vehicle communication systems 114, and/or mobile device 120. Such telematics data may include each item of vehicle performance and operational data described herein (e.g., velocity, rates of acceleration and/or deceleration, braking, swerving, impact to the body of the vehicle, air bag deployment, and the like). In some instances, telematics system 140 may receive telematics data from a plurality of vehicles.

The telematics data provided to telematics system 140 may be provided continuously and in real-time. In one instance, the telematics data may be provided in standardized time intervals (e.g. every 10 seconds, 30 seconds, 1 minute, etc.). In such instances, the telematics data provided may correspond to the particular time interval at which the telematics data is sent. In another instance, the telematics data may be provided in intermittent lumps corresponding to standardized time intervals. For example, the standardized time interval may be 30 seconds and at the conclusion of each 30 second interval the telematics system 140 may receive telematics data corresponding to each second within the particular 30 second interval.

At step 204, when received, the telematics data may be analyzed by the telematics system 140 in order to determine whether or not an accident has occurred. For example, telematics system 140 may receive telematics data indicating that vehicle 110 has decelerated from 45 mph to 0 mph with high rotational velocity (e.g., swerving) and air bag deployment. Such data, when analyzed by telematics system 140, may indicate that vehicle 110 has been involved in an accident. In some instances, telematics system 140 may receive telematics data corresponding at least in part to impact data from pressure sensors on the body of the vehicle 110, which may indicate that vehicle 110 has been involved in an accident.

In some arrangements, a crash notification may be used to provide an indication that an accident has occurred. For instance, arrangements described U.S. patent application Ser. No. 14/685,067 entitled, "Automatic Crash Detection" filed on Apr. 4, 2015, which is incorporated herein by reference and a copy of which has been submitted with the Information Disclosure Statement concurrently filed with this application, may be used in conjunction with aspects described in the present disclosure to do determine that a vehicle has been involved in an accident.

If the telematics data received at step 202 does not indicate that the vehicle 110 associated with the user has been involved in an accident, telematics system 140 may return to step 202 and continue to receive data associated with the user's vehicle from telematics device 113, vehicle control computer on-board computer 115 via vehicle communication systems 114, and/or mobile device 120. Alternatively, if the telematics data received at step 202 indicates that the vehicle was involved in an accident, telematics system 140 may proceed to step 206 as will be described below.

In one example, after determining that the vehicle associated with the user was involved in an accident based on the received telematics data, telematics system 140 may provide an alert to emergency personnel (e.g., police, EMS, firefighters, etc.). The alert may include the telematics data received from telematics device 113, vehicle control computer on-board computer 115 via vehicle communication systems 114, and/or mobile device 120. Such telematics data may include at least the velocity of the vehicle at the time of the accident, an indication of seat belt usage and airbag deployment, and a GPS location associated with the vehicle. In some instances, the alert may include all of the telematics data received from telematics device 113, vehicle control computer on-board computer 115 via vehicle communication systems 114, and/or mobile device 120.

At step 206, telematics system 140 may activate the injury determination application on the mobile device 120 associated with the user involved in the accident. Upon activation, the injury determination application may be configured to cause mobile device 120 to emit an audible tone and produce a vibratory effect. In some instances the audible tone may be a ringing, beeping, and/or buzzing tone and in other instances, the audible tone may be a verbal tone indicating that the user was involved in an accident and that emergency response personnel are being dispatched. The audible tone and vibratory effect produced by mobile device 120 responsive to the activation of the injury determination application may be indefinite. For example, the injury determination application may be configured to cause mobile device 120 to produce the audible tone and vibratory effect until mobile device 120 is unlocked and/or interacted with.

Alternatively, in instances in which the injury determination application has not been previously installed on the mobile device 120, telematics system 140 may provide a text notification to the mobile device 120 associated with the user involved in the accident. The text notification may include text indicating that the user was involved in an accident and that emergency response personnel are being dispatched. Additionally, the text notification may include a jumplink to an application download interface associated with the injury determination application wherein the user may be able to download the injury determination application. In some instances, the text notification may further include a URL for the web-based injury determination application performed on telematics system 140.

In some instances, after performing step 206 and receiving user interaction with the injury determination application and/or the injury determination web application, telematics system 140 may provide one or more questions regarding the accident to the user associated with the vehicle involved in the accident through mobile device 120 via the injury determination application and/or the injury determination web application. In some instances, the questions may include the geographical location of the accident, type of accident (e.g., head-on collision, rear-end collision, driver side collision, passenger side collision, etc.), whether or not the user was injured in the accident and, if the user was injured in the accident, what body areas of the user are experiencing pain. Additionally, the questions may further include whether or not there were any passengers in the vehicle, where the passengers were seated, whether or not the passengers were injured in the accident and, if the passengers were injured in the accident, what body areas of the passengers are experiencing pain. Responsive to providing the questions, telematics system 140 may receive responses to the one or more questions from the user of the vehicle 110 associated with mobile device 120. In instances in which the user (e.g., driver) of vehicle 110 associated with mobile device 120 fails to interact with the injury determination application activated on mobile device 120 and/or access the injury determination web application, emergency response personnel may be further notified that the user of vehicle 110 is unresponsive.

At step 208, telematics system 140 may determine injuries likely to have been sustained by the user and/or passengers. In some instances, the determination may be performed based off of the received telematics data associated with the vehicle of the user and/or the user's responses to the one or more questions regarding the accident. Upon receiving the telematics data and the responses to the questions about the accident, injury assessment server 160 of telematics system 140 may generate an injury assessment profile associated with the user who submitted the information. The injury assessment profile may include an injury assessment matrix comprising the data associated with the accident (e.g., telematics data and responses to the questions about the accident).

The injury assessment matrix may be a standardized m-by-n matrix storing the data associated with the accident in numerical form. The data may be entered by the injury assessment server 160 in the order in which the category corresponding to the data is received (e.g., telematics data first, responses to the questions second regarding the accident second, etc.). The order in which the data categories are received may further correspond to the row or column of the injury assessment matrix into which the data is entered and stored. In other words, the first category of data received (e.g., telematics data) may occupy the first row or first column of the loss assessment matrix. From there, injury assessment server 160 may enter each individual data item within the first category along the first row or the first column in sequential matrix elements comprised within the first row or the first column. For example, in regards to the received vehicle operational data (e.g., the first category), the first element within the first row or first column may be vehicle velocity at the time of the accident, the second element within the first row or first column may be vehicle acceleration at the time of the accident, the third element within the first row or first column may be the degree of brake activation during the time of the accident, and so on until each of the received data elements within the first category are entered into the first row or first column. After entering each of the received data elements associated with the first category, the injury assessment server 160 may enter each of the received data elements within the second category in a manner similar to that described above with respect to the first category.

In some instances, the injury assessment matrix may further include a third category occupying a third row and/or a third column. The third category entered by injury assessment server after the injury assessment method has been completed and may be reserved for the estimated type of injuries to the user and/or passengers of the vehicle, estimated medical costs associated with the injuries, estimated type of procedures needed to heal the injuries, estimated injury healing time, and the like. As will be described in further detail below, the loss assessment matrix may also include a fourth category including the actual type of injuries to the user and/or passengers of the vehicle, actual medical costs associated with the injuries, actual type of procedures needed to heal the injuries, actual injury healing time, and the like.

The entry of each data element within the rows or columns of the matrix may be done in accordance with predetermined injury assessment matrix generation guidelines. As such, each of the injury assessment matrices generated by the injury assessment server 160 may be of a standardized format wherein each column and row position corresponds to a specific data element. For example, the first data element of the first row and the first column may correspond to the velocity of the vehicle at the time of the accident in each loss assessment matrix generated by injury assessment server 160. Similarly, as will be discussed in further detail below, each of the injury assessment matrices stored in historical data source database 154 may be of the same standardized format as that of the injury assessment matrices generated by injury assessment server 160 wherein each column and row position corresponds to a specific data element. Through the utilization of homogenous injury assessment matrices, telematics system 140 may increase processing efficiency by establishing a standardized data element to data element comparative structure wherein each data element is compared across injury assessment matrices against the corresponding data element of each of the injury assessment matrices. Thus, the determining of matches and/or hits of one injury assessment matrix against another is consolidated to the total number of correlated and/or shared data elements, as opposed to other methods which mandate the assessment of the interrelation between data elements.

In some instances, the data elements within a specific category may be greater or less than the data elements of other categories. For example, the first category (e.g., telematics data) may include 25 data elements, the second category (responses to questions regarding the accident) may include 4 data elements, the third category (e.g., estimated injury information) may include 10 data elements, and the fourth category (e.g., actual injury information) may include 10 data elements. In such instances, the category with the largest amount of data elements (e.g., the first category) may define the number of columns in the loss assessment matrix or the number of rows in the loss assessment matrix depending on whether or not the data elements are entered in a row or column. Each of the remaining categories with fewer data elements may include naught entries corresponding to the difference in data elements. For example, if the first category has 25 data elements and the second category has 4 data elements, the second category will include 21 naught entries. Naught entries may also be provided for data expected to be received by injury assessment server 160, but not provided by telematics device 113, on-board computer 115 via vehicle communication systems 114, and/or mobile device 120.

After injury assessment server 160 has generated the injury assessment matrix associated with the user, injury assessment server 160 may transmit the generated injury assessment matrix to the historical data source server 150. The historical data source server 150 may compare the injury assessment matrix of the injury assessment profile against the totality of historical injury assessment matrices of historical injury assessment profiles stored in historical data source database 154.

In determining a match and/or a hit of the injury assessment matrix against the totality of the historical injury assessment matrices stored in the historical data source database 154, the historical data source server 150 may identify matches and/or hits based upon the correlation of one or more data elements shared by the matrices. Additionally, the historical data source server 150 may further associate a level of confidence to the overall quality of the match of the injury assessment matrix to each of the matched historical injury assessment matrices based upon the total number of correlated data elements in the first and second categories. For example, a correlation of one data element will be given a minimum confidence level, whereas a correlation of each and every data element will be given a maximum confidence level.

After the historical data source server 150 has compared the injury assessment matrix of the injury assessment profile against the totality of historical injury assessment matrices of historical injury assessment profiles stored in historical data source database 154 and has determined one or more matches and/or hits, historical data source server 150 may transmit the historical injury assessment profiles corresponding to the historical injury assessment matrices of the one or more matches and/or hits stored in historical data source database 154 to injury assessment server 160.

Responsive to receiving the historical injury assessment profiles from the historical data source server 150, injury assessment server 160 may extract the actual injury data from the historical injury assessment matrix matched and/or hit with the highest level of confidence. The extracted injury data may correspond to the estimated type of injuries to the user and/or passengers of the vehicle, estimated medical costs associated with the injuries, estimated type of procedures needed to heal the injuries, estimated injury healing time, and the like.

At step 210, after determining estimated type of injuries to the user and/or the passengers of the vehicle, estimated medical costs associated with the injuries, estimated type of procedures needed to heal the injuries, estimated injury healing time, and the like, injury assessment server 160 may determine whether or not to provide the user with an alert that urgent care is needed for the user and/or passengers of the vehicle. In some instances, the determination of whether or not to provide the user with an alert may be performed in relation to the estimated type of injuries to the user and/or passengers of the vehicle. For example, if injuries are estimated to have occurred affecting the head, neck, and/or internal organs of the user and/or passengers of the vehicle, injury assessment server 160 may provide notification to the user that urgent care is needed. Alternatively, the alert may be sent based on the telematics data received from the vehicle 110 at the time of the accident. For example, if the vehicle 110 was travelling above a certain velocity at the time of the accident (e.g., 35 mph, 40 mph, 45 mph, etc.), the alert may be sent to the user.

In other instances, the alert may be sent to the user if the airbags of the vehicle deployed in the accident. For example, when a vehicle 110 was involved in an accident and the airbag(s) of the vehicle 110 were deployed in the accident, telematics data provided to a telematics system 140 may include an indication of the airbag deployment. Such an indication may be associated with a particular data element within the standardized injury assessment matrix generated in response to the user being in the accident. In determining whether or not to provide an alert for the necessity of urgent care, injury assessment server 160 may analyze the injury assessment matrix in regards to the particular data element corresponding to airbag deployment. If the data element is present corresponding to airbag deployment, injury assessment server 160 may provide an alert to the user that urgent care is needed. Alternatively, if the data element is not present corresponding to airbag deployment, injury assessment server 160 may not provide an alert to the user that urgent care is needed.

In instances in which injury assessment server 160 determines not to provide an alert to the user regarding the necessity of urgent care, pre-FNOL assessment methods may be performed at step 212. In some arrangements, the pre-FNOL assessment method may be conducted in order to determine the costs of repairing damages to the vehicle and accompanying insurance policy changes if an insurance claim were to be filed to cover the determined repair costs. For instance, arrangements described in U.S. patent application Ser. No. 15/271,812 entitled, "Enhanced Image Capture and Analysis of Damaged Tangible Objects" filed on Sep. 21, 2016, which is incorporated herein by reference and a copy of which has been submitted with the Information Disclosure Statement concurrently filed with this application, may be used in conjunction with aspects described in the present disclosure to determine costs of repairing damages to the vehicle and accompanying insurance policy changes when, for example, an insurance claim is filed for the determined repair costs.

In instances in which injury assessment server 160 determines to provide the alert to the user regarding the necessity of urgent care, injury assessment server 160 may provide the user with the alert at step 214. After presenting the user with the alert, injury assessment server 160 may transmit the user's injury assessment profile to medical clearinghouse server 170. At step 216, upon receipt of the user's injury assessment profile, medical clearinghouse server 170 may extract geographical location information corresponding to the user and may generate a map through the injury assessment application operating on mobile device 120 of the user and/or an injury assessment web application being accessed by an internet browser application operating on mobile device 120. The geographical location associated with the mobile device 120 of the user may be used by medical clearinghouse server 170 to localize the map corresponding to the user's geographical location. Additionally, medical clearinghouse server 170 may render one or more pins on the map corresponding to urgent care facilities, clinics, and hospitals in the user's immediate area based on the user's geographical location.

Each of the pins associated with a particular urgent care facility, clinic, and hospital may be a user-selectable pin. Once selected, medical clearinghouse server 170 may generate an urgent care facility, clinic, and/or hospital specific screen on the injury assessment application and/or the injury assessment web application. The urgent care facility, clinic, and/or hospital specific screen may provide data about the urgent care facility, clinic, and/or hospital such as an address, telephone number, types of services performed, and the like.

In some instances, medical clearinghouse server 170 to generate a sortable list through the injury assessment application operating on mobile device 120 of the user and/or a injury assessment web application being accessed by an internet browser application operating on mobile device 120. The sortable list may display each of the urgent care facilities, clinics, and hospitals within the geographical location associated with the mobile device 120 of the user, starting with the nearest to urgent care facilities, clinics, and hospitals to the geographical location associated with the mobile device 120 and terminating with the urgent care facilities, clinics, and hospitals furthest from the geographical location associated with the mobile device 120. The user of mobile device 120 may be able to sort the urgent care facilities, clinics, and hospitals comprised within the sortable list based on factors such as highest ranking, nearest location, availability, and the like. In some instances, the user may be able to toggle between the map interface and the sortable list interface.

At step 218, medical clearinghouse server 170 may receive a user selection of an urgent care facility, clinic, or hospital at which the user and/or passengers of the vehicle are going to receive treatment. Responsive to receiving such a user selection, medical clearinghouse server 170 may transmit the information associated with the urgent care facility, clinic, or hospital selected by the user to injury assessment server 160. After receiving the information associated with the urgent care facility, clinic, or hospital selected by the user, injury assessment server 160 may transmit the telematics data of the vehicle of the user at the time of the accident, the user's responses to the one or more questions about the accident, and the estimated injuries sustained by the user and/or passengers of the vehicle during the accident to the urgent care facility, clinic, or hospital selected by the user.

At step 220, responsive to transmitting the telematics data of the vehicle of the user at the time of the accident, the user's responses to the one or more questions about the accident, and the estimated injuries sustained by the user and/or passengers of the vehicle during the accident to the urgent care facility, clinic, or hospital selected by the user, injury assessment server 160 may activate a GPS associated with the mobile device 120 of the user. In response to activating the GPS of the mobile device 120, injury assessment server 160 may be configured to receive location information corresponding to the real-time geographical location of the mobile device 120 of the user. Based on the received location information, injury assessment server 160 may be able to determine an estimated time of arrival for the user and/or passengers of the vehicle at the user-selected urgent care facility. The estimated time of arrival may be a dynamic estimation calculated in real-time by the injury assessment server 160 based on the real-time geographical locational changes associated with the mobile device 120 of the user. In some instances, the injury assessment server 160 may be configured to transmit the determined estimated time of arrival of the user and/or passengers of the vehicle to the user-selected urgent care facility.

Through activating the GPS only after an accident is detected, telematics system 140 is actively conserving battery power on mobile device 120. As one of ordinary skill in the art would readily appreciate, GPS is battery-intensive and, in some cases, battery-exhaustive. As such, by activating the GPS on mobile device 120 in a state in which an accident has been determined to have occurred, the disclosure provided herein provides a technical advantage because it enables the performance in the injury assessment methods described herein to be conducted without the GPS of mobile device 120 being on at all times.

At step 222, responsive to determining that the estimated time of arrival of the user at the user-selected urgent care facility is under one minute and/or that the geographical location of the mobile device 120 of the user is within a predefined radius of the user-selected urgent care facility (e.g., 3 miles, 1 mile, 1000 feet, etc.), injury assessment server 160 may activate a Bluetooth, WiFi, and/or NFC communication circuitry associated with the mobile device 120. Upon activation, the Bluetooth, WiFi, and/or NFC communication circuitry may transmit a user signifier beacon comprising general information associated with the user and/or passengers of the vehicle including at least name and date of birth. In some instances, a fitness wristband (e.g., FitBit) or smart watch of the user may be configured to transmit the general information. Through the transmittal of the user signifier beacon, the user and/or passengers of the vehicle injured in the accident may be recognized in real-time upon arrival at the user-selected urgent care facility and patient intake may be seamlessly performed.

FIG. 3 illustrates a block diagram of a computing device 301 in a pre-FNOL assessment system 300 that may be used according to one or more illustrative embodiments of the disclosure. The computing device 301 may have a processor 303 for controlling overall operation of the computing device 301 and its associated components, including RAM 305, ROM 307, input/output module 309, and memory unit 315. The computing device 301, along with one or more additional devices (e.g., terminals 341, 351) may correspond to any of multiple systems or devices, such as close call detection devices or systems, configured as described herein for receiving data from various sources, populating a rolling short term logical table with the received data, and eliciting a particular vehicular response based on the populated data items exceeding near short term (e.g., five seconds to five minutes) association thresholds.

Input/Output (I/O) module 309 may include a microphone, keypad, touch screen, and/or stylus through which a user of the computing device 301 may provide input, and may also include one or more of a speaker for providing audio input/output and a video display device for providing textual, audiovisual and/or graphical output. Software may be stored within memory unit 315 and/or other storage to provide instructions to processor 303 for enabling device 301 to perform various functions. For example, memory unit 315 may store software used by the device 301, such as an operating system 317, application programs 319, and an associated internal database 321. The memory unit 315 includes one or more of volatile and/or non-volatile computer memory to store computer-executable instructions, data, and/or other information. Processor 303 and its associated components may allow the computing device 301 to execute a series of computer-readable instructions to perform the pre-FNOL assessment and online advisor methods described herein.

The computing device 301 may operate in a networked environment 300 supporting connections to one or more remote computers, such as terminals/devices 341 and 351. Close call detection device 301, and related terminals/devices 341 and 351, may include devices installed in vehicles, mobile devices that may travel within vehicles, or devices outside of vehicles that are configured to receive and process vehicle and other sensor data. Thus, the computing device 301 and terminals/devices 341 and 351 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 301. The network connections depicted in FIG. 3 include a local area network (LAN) 325 and a wide area network (WAN) 329, and a wireless telecommunications network 1033, but may also include other networks. When used in a LAN networking environment, the computing device 301 may be connected to the LAN 325 through a network interface or adapter 323. When used in a WAN networking environment, the device 301 may include a modem 327 or other means for establishing communications over the WAN 329, such as network 331 (e.g., the Internet). When used in a wireless telecommunications network 333, the device 301 may include one or more transceivers, digital signal processors, and additional circuitry and software for communicating with wireless computing devices 341 (e.g., mobile phones, short-range vehicle communication systems, vehicle sensing and telematics devices) via one or more network devices 335 (e.g., base transceiver stations) in the wireless network 333.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 319 used by the computing device 1001 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
   receiving data from a vehicle indicating that the vehicle occupied by a user is involved in an accident;
   activating, in response to receiving the data, an injury determination application installed on a mobile device of the user involved in the accident;
   prompting the user involved in the accident to provide responses to one or more questions regarding the accident via the injury determination application;
   determining, based on the received data and the responses to the one or more questions regarding the accident, one or more injuries sustained by the user during the accident;
   providing the user with a list of urgent care facilities capable of providing the user with treatment for the determined one or more injuries;
   receiving a user selection of an urgent care facility from the list of urgent care facilities; and
   transmitting the received data, the responses to the one or more questions, and the determined one or more injuries to the urgent care facility selected by the user.

2. The method of claim 1, wherein the prompting the user involved in the accident to provide responses to the one or more questions regards the accident includes prompting the user to provide responses to at least one or more questions regarding injuries sustained during the accident.

3. The method of claim 1, further comprising:
   receiving telematics data from the vehicle of the user, wherein the received telematics data indicates that the accident has occurred.

4. The method of claim 3, wherein the telematics data includes at least velocity of the vehicle at a time of the accident, a seat belt usage indication at the time of the accident, an airbag deployment indication at the time of the accident, and a GPS location associated with the vehicle at the time of the accident.

5. The method of claim 4, further comprising:
   providing an alert to emergency personnel that the accident has occurred, wherein the alert includes the telematics data associated with the vehicle of the user involved in the accident.

6. The method of claim 1, further comprising:
   determining, by GPS circuitry, a geographical location of the user at a time of the accident; and generating the list of urgent care facilities based on the geographic location of the user.

7. The method of claim 1, further comprising:
providing an alert to the mobile device associated with the user that urgent care is needed based on the determined one or more injuries sustained by the user during the accident.

8. An injury determination apparatus comprising:
an electronic communication channel with a sensor of a vehicle;
an on-screen display;
a GPS circuitry;
a processor; and
memory storing computer readable instructions that, when executed by the processor, cause the injury determination apparatus to:
receive data through the electronic communication channel from the vehicle indicating that the vehicle occupied by a user is involved in an accident;
activate, in response to receiving the data, an injury determination application installed on the injury determination apparatus of the user involved in the accident;
prompt the user involved in the accident to provide responses to one or more questions regarding the accident via the injury determination application;
determine, based on the received data and the responses to the one or more questions regarding the accident, one or more injuries sustained by the user during the accident;
provide the user with a list of urgent care facilities on the on-screen display capable of providing the user with treatment for the determined one or more injuries;
receive a user selection on the on-screen display of an urgent care facility from the list of urgent care facilities;
transmit the received data and the determined one or more injuries to the urgent care facility selected by the user;
activate the GPS circuitry in response to the determining that one or more injuries has been sustained;
determine, by the activated GPS circuitry, a location of the user relative to the urgent care facility selected by the user; and
transmit, to the urgent care facility, an estimated time of arrival for the user at the urgent care facility.

9. The injury determination apparatus of claim 8, wherein the computer readable instructions, when executed by the processor, further cause the injury determination apparatus to:
determine the estimated time of arrival based on the location of the user relative to a location of the urgent care facility selected by the user.

10. The injury determination apparatus of claim 8, wherein the computer readable instructions, when executed by the processor, further cause the injury determination apparatus to:
receive telematics data through the electronic communication channel from the vehicle of the user, wherein the received telematics data indicates that the accident has occurred.

11. The injury determination apparatus of claim 10, wherein the telematics data includes at least velocity of the vehicle at a time of the accident, a seat belt usage indication at the time of the accident, an airbag deployment indication at the time of the accident, and a GPS location associated with the vehicle at the time of the accident.

12. The injury determination apparatus of claim 11, wherein the computer readable instructions, when executed by the processor, further cause the injury determination apparatus to:
provide an alert to emergency personnel that the accident has occurred, wherein the alert includes the telematics data associated with the vehicle of the user involved in the accident.

13. The injury determination apparatus of claim 8, wherein the list of urgent care facilities provided to the user is determined based on a geographical location of the user at a time of the accident.

14. The injury determination apparatus of claim 8, wherein the computer readable instructions, when executed by the processor, further cause the injury determination apparatus to:
provide an alert to a mobile device associated with the user that urgent care is needed based on the determined one or more injuries sustained by the user during the accident.

15. An injury determination system comprising:
a telematics device configured to transmit vehicle data to a mobile device associated with a user;
the mobile device, including:
at least one processor; and
at least one memory storing computer readable instructions that, when executed by the processor, cause the mobile device to:
receive data from the telematics device indicating that a vehicle occupied by the user is involved in an accident;
activate, in response to receiving the data, an injury determination application installed on the mobile device of the user involved in the accident;
prompt the user involved in the accident to provide responses to one or more questions regarding the accident via the injury determination application;
determine, based on the received data and the responses to the one or more questions regarding the accident, one or more injuries sustained by the user during the accident;
provide the user with a list of urgent care facilities capable of providing the user with treatment for the determined one or more injuries;
receive a user selection of an urgent care facility from the list of urgent care facilities; and
transmit the received data and the determined one or more injuries to the urgent care facility selected by the user.

16. The injury determination system of claim 15, wherein the computer readable instructions, when executed by the at least one processor, further cause the mobile device to:
provide an alert to the user that urgent care is needed based on the determined one or more injuries sustained by the user during the accident.

17. The injury determination system of claim 15, wherein the computer readable instructions, when executed by the at least one processor, further cause the mobile device to:
receive telematics data from the vehicle of the user, wherein the received telematics data indicates that the accident has occurred.

18. The injury determination system of claim 17, wherein the telematics data includes at least velocity of the vehicle at a time of the accident, a seat belt usage indication at the time of the accident, an airbag deployment indication at the time of the accident, and a GPS location associated with the vehicle at the time of the accident.

19. The injury determination system of claim 18, wherein the computer readable instructions, when executed by the at least one processor, further cause the mobile device to:
provide an alert to emergency personnel that the accident has occurred, wherein the alert includes the telematics data associated with the vehicle of the user involved in the accident.

20. The injury determination system of claim 15, wherein the list of urgent care facilities provided to the user is determined based on a geographical location of the user at a time of the accident.

\* \* \* \* \*